(12) United States Patent
Klein et al.

(10) Patent No.: US 11,461,845 B2
(45) Date of Patent: Oct. 4, 2022

(54) SYSTEM AND METHOD FOR SETTLING MONETARY AND QUOTA-ALLOCATED DUAL CURRENCY TRANSACTIONS

(71) Applicants: Mark Klein, Henderson, NV (US); Wendell Brown, Henderson, NV (US)

(72) Inventors: Mark Klein, Henderson, NV (US); Wendell Brown, Henderson, NV (US)

(73) Assignee: CLIMATE KARMA SOLUTIONS INC., Henderson, NV (US)

(*) Notice: Subject to any disclaimer, the term of this patent is extended or adjusted under 35 U.S.C. 154(b) by 0 days.

(21) Appl. No.: 17/109,588

(22) Filed: Dec. 2, 2020

(65) Prior Publication Data
US 2021/0166314 A1    Jun. 3, 2021

Related U.S. Application Data

(60) Provisional application No. 62/942,764, filed on Dec. 3, 2019.

(51) Int. Cl.
*G06Q 40/04* (2012.01)
*G06Q 30/00* (2012.01)
(Continued)

(52) U.S. Cl.
CPC .......... *G06Q 40/04* (2013.01); *G06Q 20/202* (2013.01); *G06Q 20/204* (2013.01);
(Continued)

(58) Field of Classification Search
CPC .... G06Q 40/04; G06Q 20/202; G06Q 20/204; G06Q 20/346; G06Q 20/4037;
(Continued)

(56) References Cited

U.S. PATENT DOCUMENTS 10,504,179 B1 * 12/2019 McGuire ................ G06Q 40/04
2002/0143616 A1 * 10/2002 Hajdukiewicz .... G06Q 30/0235
705/14.15
(Continued)

FOREIGN PATENT DOCUMENTS

AU    2007216768 A1 *  4/2009   ............ G06Q 30/06
CA    2717164 A1 *  9/2009   ............ G06Q 30/06
(Continued)

OTHER PUBLICATIONS

Srinivasan, S. Economic valuation and option-based payments for ecosystem services. Mitig Adapt Strateg Glob Change 20, 1055-1077 (2015). https://doi.org/10.1007/s11027-013-9516-5 (Year: 201).*
(Continued)

*Primary Examiner* — Ashford S Hayles
(74) *Attorney, Agent, or Firm* — Manatt, Phelps & Phillips, LLP

(57) ABSTRACT

A system and method for settling monetary and quota-allocated dual currency transactions may be used to reduce Co2 emissions. Each purchasable item (product or service) in the system may have a monetary price and a Carbon price whose value corresponds to a number of Kg of Co2 emitted by the manufacture/sale/use of the purchasable item. The system and method individualizes the reduction of Co2 emissions and allows each consumer to choose purchasable items in part based on the Carbon price.

22 Claims, 4 Drawing Sheets

(51) Int. Cl.
*G06Q 30/06* (2012.01)
*G06Q 20/40* (2012.01)
*G06Q 20/20* (2012.01)
*G06Q 20/34* (2012.01)
*G06Q 40/02* (2012.01)
*G06Q 50/26* (2012.01)

(52) U.S. Cl.
CPC ....... *G06Q 20/346* (2013.01); *G06Q 20/4037* (2013.01); *G06Q 30/018* (2013.01); *G06Q 30/0633* (2013.01); *G06Q 30/0641* (2013.01); *G06Q 40/02* (2013.01); *G06Q 50/265* (2013.01)

(58) Field of Classification Search
CPC ............. G06Q 30/018; G06Q 30/0633; G06Q 30/0641; G06Q 40/02; G06Q 50/265; Y02P 90/90
See application file for complete search history.

(56) References Cited

U.S. PATENT DOCUMENTS

| | | | | |
|---|---|---|---|---|
| 2002/0143693 | A1* | 10/2002 | Soestbergen | G06Q 30/06 705/37 |
| 2005/0154669 | A1* | 7/2005 | Streetman | G06Q 99/00 705/38 |
| 2006/0089851 | A1* | 4/2006 | Silby | G06Q 40/00 705/500 |
| 2006/0095356 | A1* | 5/2006 | Koornstra | G06Q 20/208 705/35 |
| 2007/0233616 | A1* | 10/2007 | Richards | G06Q 10/06 705/400 |
| 2007/0255457 | A1* | 11/2007 | Whitcomb | G05B 15/02 700/273 |
| 2008/0208486 | A1* | 8/2008 | Natunen | G06Q 30/0601 702/30 |
| 2008/0228632 | A1* | 9/2008 | Gotthelf | G06Q 40/04 705/37 |
| 2009/0157510 | A1* | 6/2009 | Pridmore | G06Q 30/0215 705/14.17 |
| 2009/0187493 | A1* | 7/2009 | Whiteman | G06Q 10/0833 705/28 |
| 2009/0292617 | A1 | 11/2009 | Sperling et al. | |
| 2010/0063902 | A1* | 3/2010 | Constantz | G06Q 40/00 705/28 |
| 2010/0131343 | A1* | 5/2010 | Hamilton, II | G06Q 30/0631 705/26.1 |
| 2010/0145743 | A1* | 6/2010 | Colquhoun | G07F 17/0014 705/317 |
| 2010/0145833 | A1* | 6/2010 | Hamilton, II | G06Q 20/227 705/400 |
| 2010/0228601 | A1 | 9/2010 | Vaswani et al. | |
| 2010/0257124 | A1* | 10/2010 | Srinivasan | G06Q 10/06 705/348 |
| 2011/0208621 | A1* | 8/2011 | Feierstein | G06Q 40/04 705/317 |
| 2011/0213690 | A1* | 9/2011 | Ghosh | G06Q 40/04 705/317 |
| 2012/0095897 | A1* | 4/2012 | Barrow | G06Q 30/018 705/317 |
| 2013/0159188 | A1* | 6/2013 | Andon | G06Q 20/4012 705/44 |
| 2014/0089073 | A1* | 3/2014 | Jacobs | G06Q 20/326 705/16 |
| 2014/0155148 | A1* | 6/2014 | Wrightsil | G06Q 40/04 705/317 |
| 2015/0081411 | A1* | 3/2015 | Tucker | G06Q 40/06 705/14.17 |
| 2016/0034910 | A1* | 2/2016 | Davis | G06Q 20/3224 705/14.27 |
| 2016/0155130 | A1* | 6/2016 | Kale | G06Q 30/0279 705/317 |
| 2019/0005578 | A1 | 1/2019 | Gagne | |
| 2019/0108516 | A1* | 4/2019 | Jawaharlal | G06Q 10/0639 |

FOREIGN PATENT DOCUMENTS

| | | | | |
|---|---|---|---|---|
| CA | 2700644 A1 * | 3/2010 | .......... | G06Q 10/087 |
| CN | 102663607 A * | 9/2012 | | |
| CN | 104471609 A * | 3/2015 | ............ | G06Q 10/30 |
| CN | 104766237 A * | 7/2015 | | |
| GB | 2470216 A * | 11/2010 | ............ | G06Q 10/06 |
| JP | 2009087317 A * | 4/2009 | | |
| KR | 101070607 B1 * | 2/2012 | | |
| KR | 20120011350 A * | 2/2012 | | |
| KR | 101709761 B1 * | 2/2017 | | |
| TW | I592895 B * | 7/2017 | | |
| TW | M546551 U * | 8/2017 | | |
| WO | WO-2008038295 A1 * | 4/2008 | ............ | G06Q 20/06 |
| WO | WO-2009062108 A1 * | 5/2009 | ............ | G06Q 10/00 |
| WO | WO-2009155496 A1 * | 12/2009 | ............ | G06Q 10/30 |
| WO | WO-2011029142 A1 * | 3/2011 | ............ | G06Q 30/02 |
| WO | WO-2013010160 A1 * | 1/2013 | ........... | G06Q 30/018 |

OTHER PUBLICATIONS

Coderoni, S., Longhitano, D., & Vinci, A. (2014). Payment for Ecosystem Service for Carbon Credits From Italian Olive Groves. Some Issues Regarding the Mode of Payment. International Journal of Food and Agricultural Economics, 2(4), 63-79. (Year: 2014).* https://ecosphere.plus/2018/05/27/ecosphere-helps-bring-carbon-pricing-point-sale/ retrieved Dec. 3, 2021 (Year: 2018).* https://www.fastcompany.com/40576812/this-tech-offsets-the-carbon-footprint-of-each-item-you-buy retrieved Dec. 3, 2021 (Year: 2018).*

I. Satoh, "Low-Cost Carbon Offsetting and Trading," 2012 IEEE International Conference on Green Computing and Communications, 2012, pp. 549-556, doi: 10.1109/GreenCom.2012.88. (Year: 2012).*

X. He, W. Qi and X. Tang, "Optimal Pricing and Carbon Emission Abatement Allocation Decisions in Supply Chains With Option Contract," in IEEE Access, vol. 8, pp. 103833-103847, 2020, doi: 10.1109/ACCESS.2020.2999410. (Year: 2020).*

* cited by examiner

SYSTEM AND METHOD FOR SETTLING MONETARY AND QUOTA-ALLOCATED DUAL CURRENCY TRANSACTIONS

RELATED APPLICATIONS

This application claims the benefit under 35 USC 119(e) of U.S. Provisional Application No. 62/942,764, filed Dec. 3, 2019, and which is incorporated herein by reference.

FIELD

The disclosure relates generally to a system and method for reducing carbon emissions and in particular to a system that individualizes the carbon emission reduction.

BACKGROUND

The majority of atmospheric carbon dioxide ($CO_2$) emissions are the unmetered byproduct of burning hydrocarbons. The net present value of the full environmental cost of $CO_2$ emissions are not being paid by the entities generating the emissions. These environmental costs will be paid by people in the future as the effects of global warming accelerate and cause famine, large scale migrations, and armed conflict. It is widely accepted in the scientific community that reducing world-wide $CO_2$ emissions is necessary to slow the deleterious effects of climate change.

The Paris Climate Agreement of 2015, signed by 197 countries, is designed to limit greenhouse gas emissions to levels that would prevent global temperatures from increasing more than 2° C. above the temperature benchmark set before the beginning of the Industrial Revolution. Many countries have set internal goals for limiting their greenhouse emissions with only vague plans to do so. For example, in 2016, the "United States intends to achieve an economy-wide target of reducing its greenhouse gas emissions by 26-28 percent below its 2005 level in 2025 and to make best efforts to reduce its emissions by 28%" (found at www4.unfccc.int/sites/ndcstaging/PublishedDocuments/ United %20States %20of%20America%20First/ U.S.A.%20First %20NDC %20Submission.pdf) and as shown in FIG. 1. The Paris Agreement notes that developed countries should provide financial resources to help less-developed countries that are seeking to improve their economies and reduce poverty, objectives that make immediate reductions in greenhouse gas emissions difficult. The agreement specifies financial assistance goals, but falls short on methodology of converting financial assistance to greenhouse gas reduction.

In 2017, the United States emitted 5.1 trillion Kg of energy-related carbon dioxide with a population of 325 million people. That works out to about 16,000 Kg per person. A gallon of gas produces about 9 Kg of $CO_2$ when burned. Therefore, each US resident's share of $CO_2$ emissions is equivalent to the release of $CO_2$ from burning 1,800 gallons of gas, or about 5 gallons a day. That 5 gallons a day is not all consumed by driving. It's also used to produce and transport our food and it's used to manufacture the things we buy. Gas fuels our modern lifestyle.

Various schemes and proposals have been made to reduce $CO_2$ emissions. One proposal is Cap and Trade. Cap and Trade at the industry sector level has been implemented in the European Union (The Emissions Trading System). Quebec and California both have regional programs. Cap and Trade has a multitude of shortcomings including the opaque political process of determining industrial sector allocations and the importation of products from outside the covered regions where production is not burdened with the cost of carbon credits.

Personal carbon trading is Cap and Trade at the consumer level. Specific proposals vary but are generically referred to as Personal Carbon Allowances (PCAs). Individuals hold emissions credits that are granted to them in an electronic account which is debited when making energy or transportation purchases. Pushing the decision-making process to the individual level for fuels and transportation is a good start, but falls short from an overall $CO_2$ reduction approach because it does not personalize the $CO_2$ emissions cost of manufacturing, agriculture, and product packaging. Further criticism of personal carbon trading includes the complexity of paying for purchases with both monetary currency and with emissions credits. Existing personal carbon trading schemes fall short in encompassing the metering all significant sources of $CO_2$ emissions and they require an immediate shift in consumer behavior.

Known systems exist with dual currency, such as a credit card that is linked to an airline frequent flyer program, in which a purchase with a frequent flyer associated credit card updates both my dollar account at Chase Bank but also adds miles to my American Airlines miles account. However, these known systems only link the credit card to the program and do not associate any/all cards of a user with a non-monetary account. Furthermore, none of the known systems associate an account that is a greenhouse gas price for an item that is designed to reduce greenhouse gas emissions.

The technology problem presented is how to reduce $CO_2$ emissions to meet those $CO_2$ emission targets in which users/citizens are involved in the process. Thus, it is desirable to provide a RACE system and method that provides a technical solution to the above technical problem and it is to this end that the disclosure is directed.

DETAILED DESCRIPTION OF ONE OR MORE EMBODIMENTS

Figure 1:
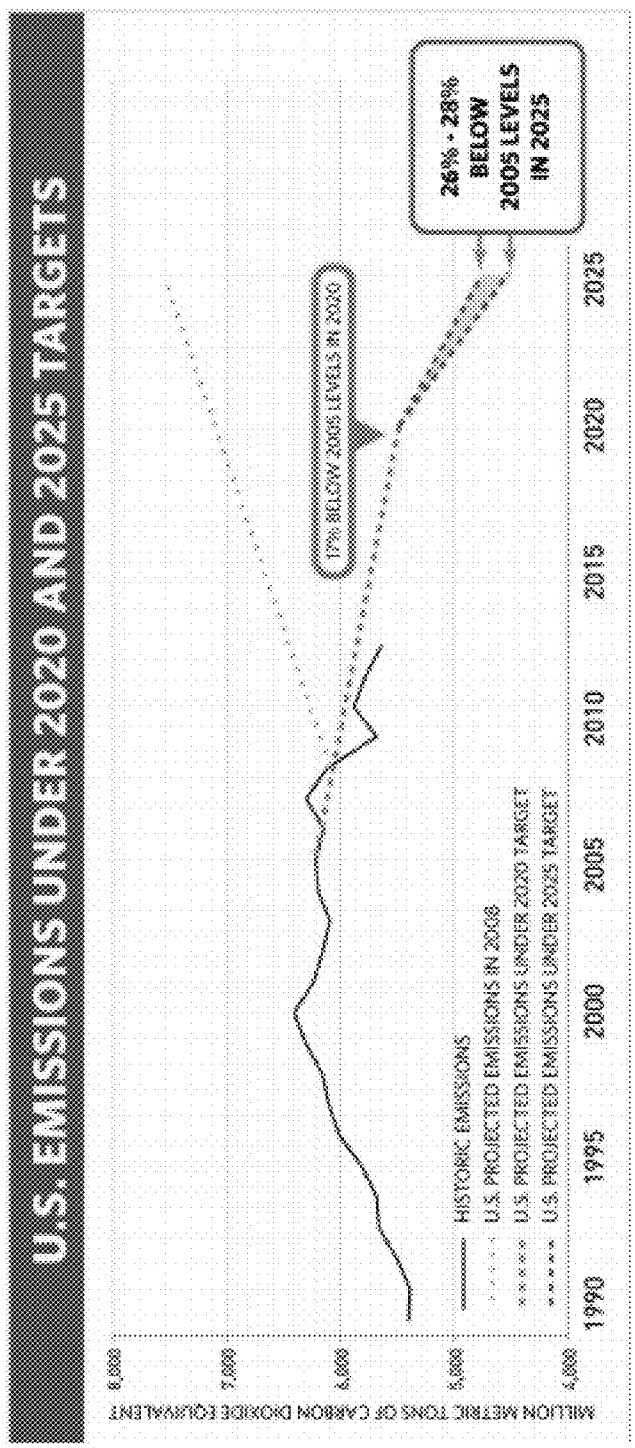
FIG. 1 is a chart showing historical and current CO2 emissions for the United States and target emissions for the United States under the Paris Agreement.

The disclosure is particularly applicable to a technology system that helps an NDC, like the United States, to meet the CO2 emission goals of the Paris Agreement and it is in this context that the disclosure will be described. It will be appreciated, however, that the RACE system and method has greater utility since it can be used for any NDC or for all NDCs and it may be used to reduce emissions of other gases and the like.

The RACE system and method rewards people for making choices that reduce $CO_2$ emitted into the atmosphere. The system accomplishes this without imposing any taxes and the system is analytical, science-based, and resistant to political manipulation by parties motivated to maintain the fossil fuel consumption status-quo. The RACE system and method is market-driven and rewards citizens for considering $CO_2$ emissions when making purchase decisions. The RACE system and method denominates $CO_2$ emissions with a new currency, called the Carbon, that represents 1 Kg of $CO_2$ emitted into the atmosphere. In the RACE system and method, products and services are priced with both a monetary value (dollars in the USA example) and Carbons. The Carbons are the cost to manufacture/use the product or service being purchased in terms of Kgs of $CO_2$ emissions. In a preferred embodiment, unlike the monetary price, the Carbon price is not marked up.

In the RACE system and method, the government each year issues each citizen's, or resident's, allocation of the Paris Agreement target $CO_2$ emissions, denominated in Carbons. Those Carbons are placed into a single account, held by a financial institution and linked to the individual. In the USA, the linkage may be accomplished using a social security number of the individual, but can be accomplished in a number of different ways that are within the scope of the disclosure. Each citizen receives the same allocation of carbons—an equal right to pollute and thus each user can choose how to spend his/her allocation of carbons since all products and services in the RACE system have a monetary price and a Carbon price and, much like nutritional labeling, the Carbon price must be visible to the citizen who is making a decision to purchase (referred to as a "Purchaser").

Changing human behavior is difficult, but the RACE system and method makes it very simple and gradual with the Carbons. On the first day after implementation, no change of consumer behavior is needed and each purchaser can continue to make their purchase decisions except that each purchase decision has a Carbons consequence. A period of time after implementation, a purchaser who causes more than the average emission of $CO_2$ will start to see that he/she is having to pay for the extra Carbons (a surcharge) and that surcharge may cause the purchaser's purchase decision to change. Everyone can learn at their own pace, but the motivation to learn and to conserve Carbons is individual financial gain since a person can sell the Carbons that they don't use during the year and reap the financial rewards.

The RACE system and method then settles the dual current (monetary and Carbon) transactions for purchases of the products and services. When paying with a credit or debit card or other electronic payment, the settlement process works as it does today with dollars (for a US transaction) being debited, and it also automatically debits Carbons from the purchaser's Carbon account.

If the purchaser's Carbon account runs out, they can still pump the gas, buy the steak, or ride the bus, but the purchaser will have to also buy the Carbons. The purchase of the Carbons may be done on Carbon Exchange and the purchaser pays for them with dollars at the current market price. The RACE system and method handles the purchase of Carbons automatically and the surcharge to the purchaser appears on the sales receipt. People are free to sell their Carbons on the Carbon Exchange and anyone who uses less than their allocation will be compensated for their unused Carbons with dollars. It can be thought of as a rebate and the RACE system and method rewards Carbon conservation.

Figure 3:
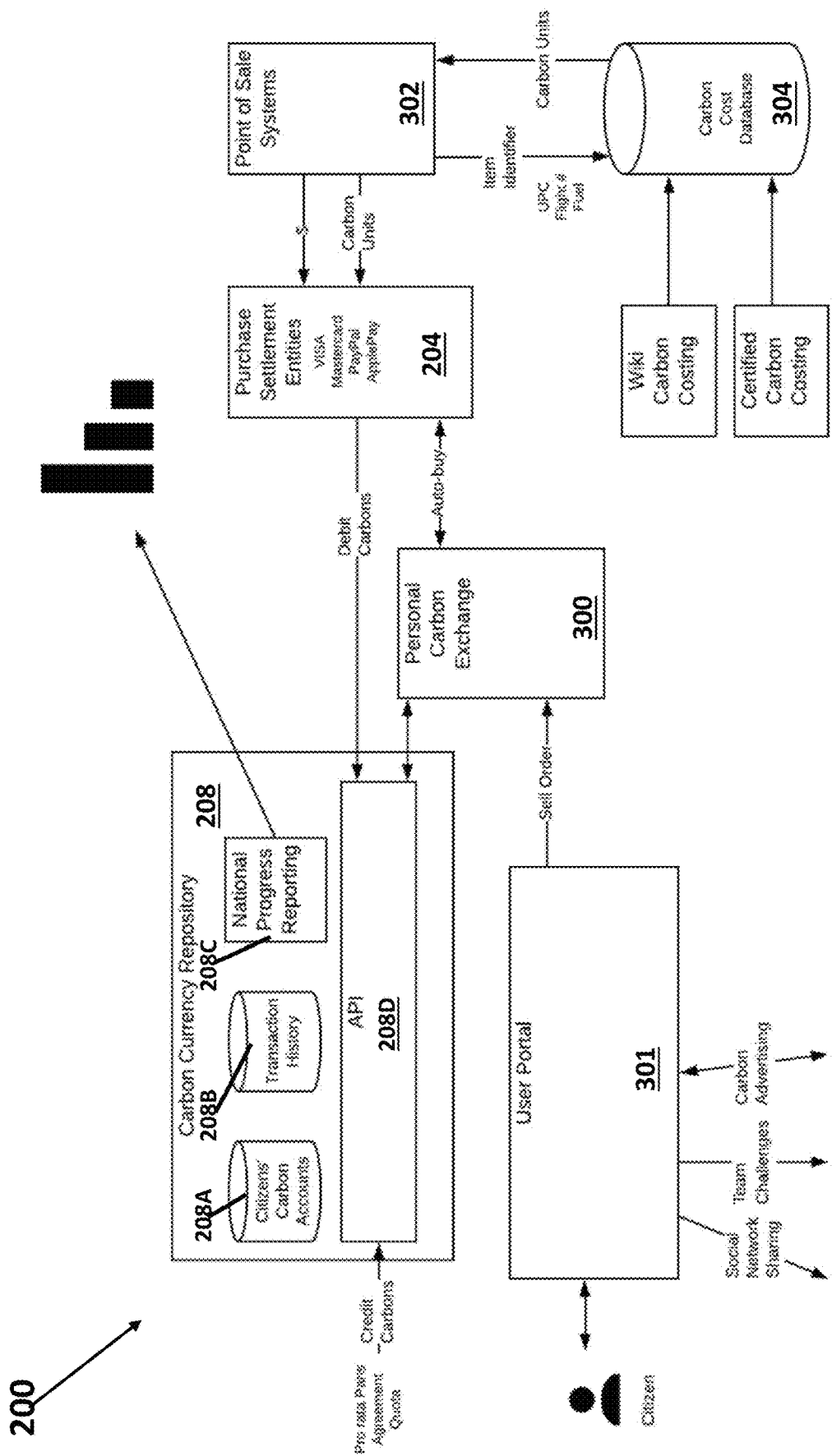
FIG. 3 is a diagram of another example embodiment of the reduce all carbon emissions (RACE) system.

In the RACE system, cash payment for products or services require the immediate purchase of Carbons on the exchange. This is handled by the RACE integration at Point of Sale as shown in FIG. 3 and discussed below. The purchase price of the necessary Carbons will appear on the receipt.

In the RACE system and method, high carbon footprint individuals will pay a premium for above-average consumption by purchasing Carbons from citizens who are more Carbon conservative. This is analogous to tiered pricing used by companies supplying electricity to consumer's homes—baseline consumption is priced low and as consumption increases, the unit cost increases.

Corporate and government entities do not receive an allocation of Carbons and they can use as much as they want. However, they must allocate the Carbons they spend into the products and services they provide. Their accounting firm must balance the Carbon books and assure they are net zero at the end of each year.

The RACE system and method can work in any country and it can be used to meet Paris Agreement commitments. Ultimately, there is a global Carbon exchange. This is a world-wide problem and the Paris Agreement appears to be our best hope for international cooperation.

The RACE method, unlike across-the-board taxation or industry-wide cap-and-trade for meeting the emission goals, gives decision making power to the consumer. This key point drives technological innovation to reduce $CO_2$ emissions. RACE is a market-driven system that drives innovation to reduce $CO_2$ emissions while maintaining our lifestyle. This is not a zero-sum game. Most of the advances we have made as humans have been demand driven with monetary cost reduction as the leading driver. However, up until now, the hidden cost of $CO_2$ emission has not been accounted for.

Individual motivation to reduce Carbon spend for financial gain will drive that innovation. When a consumer selects a flight from city A to city B, they will shop for monetary price and for Carbon price. Airlines will find ways to reduce Carbon price. Manufacturers will innovate to reduce Carbon price. Farmers will do the same. So will any entity that wants to maximize their revenue.

To meet climate change goals, worldwide $CO_2$ emissions must be reduced. In each industrialized country, each citizen's rightful share must be reduced every year. It is only through market-driven innovation that we can maintain our lifestyle while living within a shrinking Carbon budget. RACE aligns individual purchase decisions with what is best for society as a whole, to slow climate change.

Figure 2:
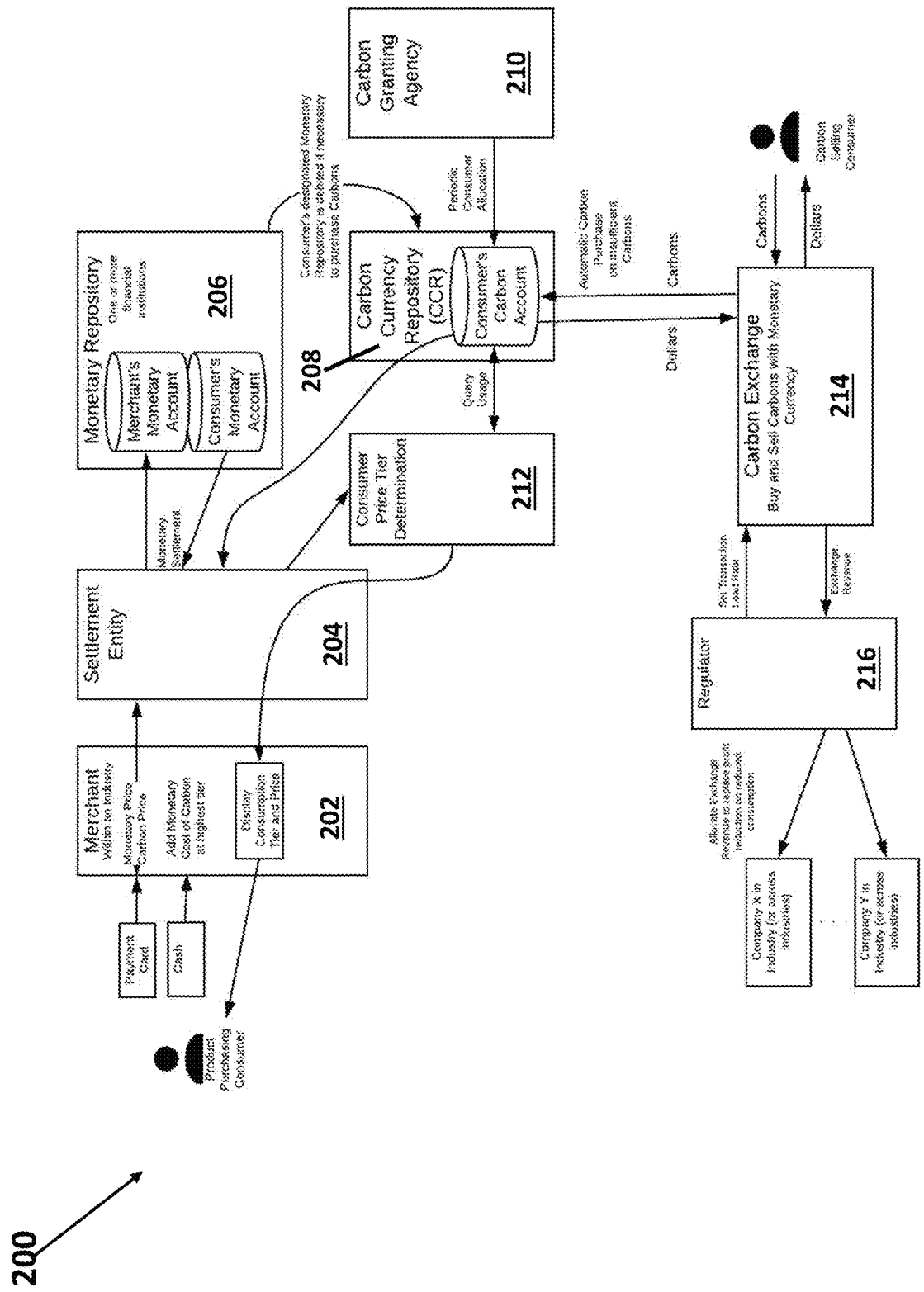
FIG. 2 is a diagram of an example embodiment of the reduce all carbon emissions (RACE) system.

FIG. 2 is a diagram of an example embodiment of the reduce all carbon emissions (RACE) system 200. The system 200 settles sales/purchase transactions for products or services that are dual priced with both a monetary currency price and an allocated/rationed Carbon currency price. The carbon currency price (known as a Carbon) has a value, for each product or service, that corresponds to an amount of carbon dioxide emitted to make, use and sell the purchased product or service. The Carbon may be measured in kilograms and each full unit of Carbon (1 Carbon unit) may correspond to 1 kg. of $CO_2$ emission. The system 200 may be implemented using a plurality of computing resources, such as processors, memory, servers, database, blade server, cloud computing resources and the like that are known, but the processes and methodologies performed by the system 200 are not conventional, well known or routine in the greenhouse gas reduction industry. In one embodiment, the functions and processes of the system 200 are partially implemented using a plurality of lines of instructions/computer code that are executed by one or more processor(s) of the computing resource of the system 200 and configure the processor(s) to perform the not well understood, not routine and unconventional processes of the system 200. Furthermore, each of the elements of system 200 may be implemented as one or more computer systems with at least one processors for executing a plurality of lines of instructions.

The system 200 may be used by a purchasable item (product or service) consumer who can use a payment card or other form of electronic charge or cash to pay a merchant 202 for the purchasable item. As discussed above, each purchasable item in the system 200 may include a monetary price and a Carbon price. For the payment card transaction, the system 200 can access a carbon account of the purchaser in a carbon currency repository 208 and thus both of those prices are communicated to a settlement entity 204. For a cash transaction (since the identity of the purchaser and his current Carbon allocation may be unknown), the system 200 communicates the monetary price of the purchasable item and a monetary cost of the carbons needed to cover the Carbon price of the purchasable item at a highest tier to the settlement entity 204. Upon completion of the purchase of the purchasable item, the merchant 202 may generate a user interface for the purchaser that displays a consumption tier for the purchaser for the Carbons and the monetary price of the Carbons when the Carbon account of the purchaser has insufficient Carbons to complete the purchase of the purchasable item.

For the monetary portion of the purchase of the purchasable item, the monetary price may be communicated to a monetary repository 206 that may be one or more financial institutions (banks, credit card companies, credit unions, etc. that each have a plurality of known computer based financial transaction processing systems). The financial institutions may store at least a merchant monetary account and a consumer monetary account. For a purchase of a purchasable item, the monetary price may be deposited into the merchant monetary account and withdrawn from the consumer monetary account (shown as a monetary settlement in FIG. 1). In addition, the consumer monetary account in the monetary repository 206 may be debited if necessary, to purchase some of all of the Carbons associated with the purchase.

In the system and method, the Carbon account of each individual may be associated automatically to a person's credit card (or any/all of the cards or electronic accounts), with the social security number being the common "link" in the United States. Thus, for example, when a buyer buys gasoline with an electronic payment card or account (e.g. VISA, Mastercard, ApplePay, Paypal, AmazonPay, gas company credit card, etc), the purchaser's personal Carbon account is associated to that electronic purchase account wherein the association can be automatic (common linkage of a 3rd party credit reporting agency such as TRW, Equifax, etc) or manually via the buyer's manual association of that card to his social security Carbon account. Alternatively, the association may be by "credit card" that could be swiped via a magnetic strip, RFID, credit card chip sensor, mobile phone or watch wearable, and also means a debit card, credit card, ATM account, or any other financially-linked payment mechanism. In one embodiment, a mathematical hash algorithm can be utilized to one-way reference an associated financial account number to an individual's Carbon account. The association in the system automates the linkage of a purchaser's various financial accounts to that same purchaser's Carbon account that facilitates the two currency settlement method and ensure that the Carbon price for the purchasable item is charged to the purchaser. The association between the Carbon account and all the monetary accounts of the purchaser also means that the system and method updates the Carbon account of the purchaser is real-time when the purchase transaction occurs in contrast to the known frequent flyer programs in which the update of the frequent flyer program account is not real-time and can take a long time to be updated.

If the above association between the card of the purchaser used for the monetary purchase of the purchasable item and the Carbon account of the purchaser is not present for whatever reason, then the cash payment model described above may be used. In particular, a purchaser using an unlinked card for the purchase of a purchasable item must buy the necessary Carbons for the purchase of the purchasable item and incur the monetary cost of the Carbons purchase since no association with the Carbon account of the purchaser exists. Thus, the system and method, regardless of the association of the account and the carbon account of the purchaser, uses a single event (paying using a card associated with the account of the purchaser) that causes two separate account updates: 1) a financial update (such as posting the dollar charge to my VISA account related to that card for example) to charge the purchaser for the monetary cost of the purchasable item; and 2) posting the Carbons associated with this purchase to my Carbon account (automatically) to charge the Carbon cost to the purchaser for the purchasable item or the purchase of the Carbons if the association between the account/card and Carbon account does not exist.

A consumer price tier determination module 212 (that may be a computer system having a processor that executes a plurality of lines of computer code/instructions to implement a price tier determination process described below) is connected to the settlement entity 204 and may receive requests to determine the price tier for a particular purchase by a particular consumer and generate the consumption tier and price data that is displayed to the consumer as described above.

The system 200 may also have a carbon currency repository (CCR) 208 that is coupled to the monetary repository 206, the consumer price tier determiner 212, a carbon granting agency 210 and a carbon exchange 214. The CCR 208 performs the carbon purchase/sales/exchange processes that are part of the system 200. For example, when a user has to purchase carbons (if the particular consumer does not have sufficient Carbons for the purchase and/or is purchasing the purchasable item by cash) that process is performed by the CCR 208. The CCR 208 may also provide data to the consumer price tier determiner 212 about the usage of carbons for a particular consumer who may have a consumer carbon account (like a monetary account except that the account has a predetermined of carbon credits of the consumer) stored in the CCR 208. Thus, the CCR 208 may have a plurality of carbon accounts for a plurality of different consumers. The carbon granting agency 210 may be an agency (government or otherwise) that periodically grants a predetermined number of carbons to each consumer that are then stored in the consumer carbon account.

The carbon exchange 214 may participate in the automatic carbon purchase for a purchase of a consumer when the consumer has insufficient carbons for a purchase which ensures that a lack of sufficient Carbons does not prevent a purchase for being consummated. Thus, as shown in FIG. 2, a monetary value will go to the carbon exchange 214 and Carbons will be purchased and sent to the CCR 208. The carbon exchange 214 may perform the buying and selling of Carbons with monetary currency. For example, a particular consumer who has extra Carbons during the allocation period of time may sell his/her Carbons to another consumer on the Carbon Exchange 214 and receive a monetary compensation.

The carbon exchange 214 may be connected to a regulator 216 who may set a transaction load rate that is a monetary percentage of each transaction of the Carbon Exchange 214 and get exchange revenue. An example load rate is 15% and the load rate may used to replace/offset lost profits from legacy energy providers (e.g., oil companies in the fossil fuel example), research and development costs, exchange fees, administrative fees, accounting fees, etc. The regulator 216 may allocate the exchange revenue to replace profit reduction due to reduce consumption of Carbon emitting operations, such as burning fuel, to one or more different companies or industries.

The preferred embodiment of the system 200 is operated with a goal of reducing atmospheric Co2 emissions by aligning individual consumer motives with the global motive of slowing climate change. Under this system 200, market-driven technological innovation as shown in FIG. 2 will consider Co2 emissions (the Carbon price) as a cost in a purchasable item (product or services) development, marketing, sales and use to meet the demand of a population that considers the Co2 emissions cost when making purchase decisions. The system, by virtue of automatically linking the settlement of both the monetary price and the Carbon price during a transaction will require no immediate change of consumer behavior, but consumers can voluntarily choose to select low Carbon purchasable items. Market-driven systems that distribute limited resources require transparency so the participants can align their best interests with the goals of the system. A vital component of the system is accurate Carbon pricing for all products. In the system, all Carbon costs (production and/or usage) for each purchasable item are shown to consumers on a label, sign, or conveyed with another method that makes weighing Carbon costs part of the consumer's purchase decision process.

For illustration purposes, five broad categories of products will be described. Services, especially services with product components, must also be considered. The system is not limited to processing transactions in these categories. In the preferred embodiment, the purchasable items in all of these categories are dual priced, having a dollar price set by the merchant and a Carbon price set by a process that can include scientific review board, manufacturer determination (subject to auditing), accounting firm, or a combination of these and other methods.

The example categories of products may include: A—Non-energy consuming products, such as books of dinnerware for example that do not consume energy or release Co2 when being used, B—Agricultural goods, such as food for example, C—Energy consuming products, such as a heater or a stove for example that emit CO2 when in use, D—Energy (Fuel and electricity) and E—Transportation Services, such as cars, taxis and airplanes. Products in categories A, B, and C have a "Production Carbon cost." This reflects Co2 already released during the creation of the product. Products in category C also have a "Usage Carbon cost" that reflect Carbon efficiency that is a measure of Co2 release during operation of the energy consuming product. Products in D and E have a "Usage Carbon cost" that reflect the Co2 that will be released when the products in these categories are used. Products in D (Energy) also have a Production Carbon cost that, for simplicity, can be included in the "Usage Carbon cost."

Using the system 200 shown in FIG. 2, the system tracks Carbons for every sales transaction made by consumers, including those made by individuals, corporations, and government entities. The Carbon accounts held by corporations and government entities can be debited without limit and these accounts serve to audit these entities' Carbon consumption. A corporation uses their Carbon account for product pricing calculations. Corporations must allocate their Carbon spending to their products. Government entities must either raise Carbons through taxation denominated in Carbons (using flat or progressive taxation), or by buying Carbons with dollars raised through monetary taxation. Government entities must acquire the Carbons necessary for all of their missions. The Federal government has a third option, it can set aside the Carbons for its budget from the national allocation before distributing the remainder to its citizenry. At the end of every accounting period (calendar or fiscal year, for example), all Carbon spending (individual, corporation and government) must match the national allocation.

For consumers who have used more than their Carbon allocation, they have automatically used the Carbon exchange 214 beginning when they surpassed their allocation to purchase the needed Carbons. For consumers who have used less than their Carbon allocation during the period, they could have (at any time) sold Carbons on the exchange. At the end of the accounting period, their excess Carbons are automatically sold on the exchange and they will receive the end-of-year monetary value.

For government entities that have spent more Carbons than they have raised through Carbon taxation or through Carbon exchange purchases, they must go to the Carbon Exchange 214 to close the shortfall and buy the Carbons that they need. Conversely, they must sell any excess Carbons at the end of the period.

For corporations, the reckoning of Carbons consumed and their allocation to products sold is audited by an accounting firm. This audit is completed in advance of the close of the Carbon accounting period. Shortfalls in Carbons or excess Carbons must be reconciled by purchases or sales on the Carbon Exchange 214 before the end of the Carbon accounting period. This process is followed by corporations at all stages of the value/production chain. In the preferred embodiment, the system can analyze the history of corporate Carbon spending, allocation to corporate products, and end-of-year variances. The result of this analysis can be one of the factors used to determine product carbon pricing.

In the example in FIG. 2, it is presumed that the consumer is a citizen of the country/region/area in which the system 200 is being operated. However, the system 200 may be used to a consumer that is not a citizen of the region/country/area who is known as a non-citizen individual. The non-citizen individual must pay the cash price surcharge (e.g., the monetary price of the purchasable items and the monetary price of the Carbon price of the purchasable item) regardless of payment mechanism, unless their country is using the system 200. If the country of the non-citizen individual also uses the system 200, the Carbons charged to the non-citizen individual for the purchase will be debited from their national account.

The system 200 can be operated world-wide or regionally. In the preferred embodiment, each nation operates a Carbon Exchange 214 that serves to assist that nation in meeting its Co2 emissions allocation. The system 200 allows for the international exchange of Carbons among consumers (citizens, government entities, and corporations) of participating nations. The international Carbon Exchange allows wealthy, more-developed, nations to purchase Carbons from less-developed nations and serves as an incentive for all participants to meet agreed upon Co2 emissions goals. This is consistent with the goals of the Paris Climate Agreement. In one embodiment, the system 200 may be rolled out worldwide by having a nation in a leadership position to require trading partners to implement dual pricing and to participate on the International Carbon Exchange.

In an alternate embodiment, the allocated-currency cost assigned to an item are estimations of the deleterious environmental effects associated with the production or use of that item. This is a generalization of carbon-cost and can include factors such as the altitude at which the Co2 is released, the release or consumption of other chemicals, depletion cost, impact of releasing pollutants (in production or anticipated consumption) in a valley, urban center, or other location where the environmental costs (and concomitant human health costs) are elevated.

In an alternate embodiment, block-chain technology is employed to support standardized transparency, auditing, and security of the allocated-currency. The system uses block-chain technology to implement or track any or all of the storage functions within the system, including allocation, journaling of sales transactions, and journaling of exchange transactions.

Using the dual currency purchasing, the Carbon account, the Carbon Exchange and the other elements of the system in FIG. 2 (which are all technical solutions and technology), the system solves the technical problem of reducing greenhouse gas emissions by using the technology to tie the reduction of the emissions to the purchasing decisions of each individual. The system and method provide an improvement in a technical field wherein the improvement include the dual currency purchasing, the Carbon account, the Carbon Exchange and the other elements of the system in FIG. 2). Furthermore, the aspects of the system in FIG. 2 are not generic computer elements nor known systems and thus are not conventional, well known or routine in any industry. Furthermore, the system and method include novel processes and elements (dual currency settlement, Carbon Exchange, etc.) that meaningfully limit the claims. For example, the system is not merely a financial process since it has novel aspects, such as the dual currency settlement, the Carbons account and Carbon exchange, that are a technology improvement.

FIG. 3 is a diagram of another example embodiment of the reduce all carbon emissions (RACE) system 200 with more details. The CCR 208 is shown and further includes a citizen carbon account 208A for each consumer discussed above, a transaction history store 208B that stores data about each Carbon transaction and a national progress reporting element 208C that shows the Carbon reduction progress. The databases 208A, 208B may be implemented as hardware or software databases or using a blockchain system. The CCR 208 may also have an API 208D that facilitates the Carbon transactions including receiving credit carbons, receiving debit carbons and interacting with a personal carbon exchange 300 that may be part of the Carbon Exchange 214 in FIG. 1 or separate. The system 200 may also have a user portal 301 that allows each citizen consumer to interact with the system 200 including sell orders for carbons to the personal carbon exchange 300. The purchase settlement entities 204 may participate in debit carbon transactions and carbon auto-buy transactions with the personal carbon exchange 300. The purchase settlement entities 204 may interface with a known point of sale (POS) system 302 that communicates the purchasable item monetary cost and Carbon cost (Carbon units) to the purchase settlement entities 204.

The POS system 302 may be connected to a carbon cost database 304. The POS system 302 may send the item identifier for a particular purchasable item (a Universal Product Code, flight number, or fuel type and quantity, etc.) to query the carbon cost database 304 and receive a value for the Carbon units to be charged for the particular purchasable item that is communicated back to the POS system 302. This permits the system 200 to function even for a purchasable item that does not already have a Carbon unit/value/price assigned to that purchasable item. As shown in FIG. 3, the carbon cost database 304 may receive input from the carbon costing wiki and a certified carbon costing resource to make the Carbon cost assessment for the particular purchasable item.

Figure 4:
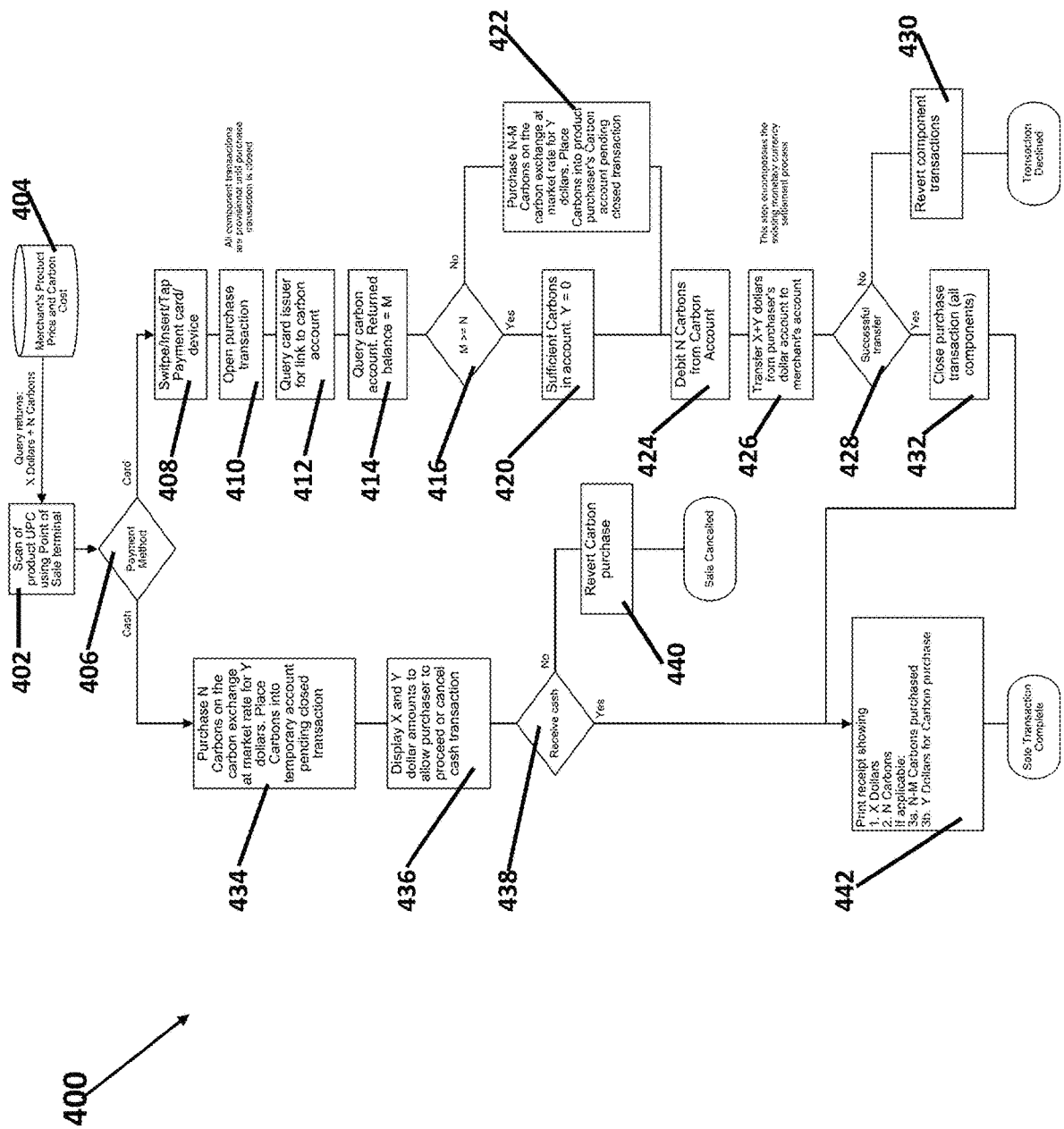
FIG. 4 illustrates a reduce all carbon emissions method.

FIG. 4 illustrates a reduce all carbon emissions method 400. The method may be performed by the system 200 shown in FIGS. 2-3, but may also be performed using other systems that can perform the services/processes of the method 400. In the preferred embodiment, each citizen consumer is automatically enrolled into the system 200 requiring no initial opt-in or configuration by the citizen consumer, but the citizen consumer can choose to make configuration changes that optimize their usage of the system 200. The Carbon Granting Agency 210 is designated by the Federal government and places Carbons into each citizen's carbon account held at the Carbon Currency Repository (CCR) 208 on an annual (or other periodic) basis. The CCR 208 can be a government entity or it can be a private financial institution. In the system, each citizen has a single Carbon account stored in the CCR 208. Government entities and corporations (non-citizens) also have a Carbon account stored in the CCR 208. These non-citizen Carbon accounts are not funded by the Carbon Granting Agency's 210 allocation.

In the preferred embodiment, virtually all sales transactions are dual priced, including non-energy consuming products, energy consuming products, agricultural goods, energy (fuel and electricity), and transportation as described above. In an alternate embodiment, a smaller set of product sales transactions are dual priced. For example, energy and transportation.

In the method 400, a product UPC of the purchasable item may be scanned at a point of purchase, such as a POS terminal) (402) and a merchant product price and a Carbon cost (N units in one example) for the purchasable item (404) may be returned to the point of purchase. The method then determines is the purchase is being made via cash or card (406) since different processes as shown in FIG. 4 may be performed for each method of purchase.

If the consumer uses a payment card, their monetary account and their Carbon account are linked by the system. Both accounts are debited automatically by the settlement entity 204 (card processor or financial institution). The merchant's monetary account in the monetary repository 206 is credited with the funds debited from the consumer's monetary account (following existing, established processes). The Carbons debited out of the consumer's account at the CCR 208, are recorded in a national auditing database, the Carbon Currency Audit. As shown in FIG. 4, the consumer may swipe/tap/insert the card into a purchase device (408) and the device opens a purchase transaction (410). The card issuer may be queried for the link to the Carbon account of the consumer (412) and the Carbon account of queried for the balance (414), such as M in this example. The method then determines if M>=N (416) which indicates that the consumer has a sufficient number of Carbons in his/her account for the purchase (420) and no buying of Carbons is needed (Y=0). A citizen consumer who pays with a payment card linked to a Carbon account will have the Carbon account automatically debited and will not be paying any monetary premium until their Carbon account reaches zero.

In the event the citizen consumer's Carbon account has insufficient Carbons to complete a transaction, the system (through their financial institution, CCR, or other entity)

goes to the Carbon exchange 214 on their behalf and purchases the necessary Carbons at the current monetary cost (Y dollars) and debits their monetary account for the Carbon purchase (422). The citizen consumer's debited monetary account can be the same monetary account they use for the initial transaction or it can be a different monetary account designated by the citizen consumer for Carbon purchases. The method may then place the purchased Carbons into the account of the consumer that is purchasing the purchasable item.

In the preferred embodiment there is a fixed allocation of Carbons for each allocation period. If the citizen consumer requires credit (a loan) for a purchase, it must be denominated in monetary currency. The designated monetary account for Carbon purchases, could be a credit account (denominated in monetary currency). All of a consumer's payment cards can be linked to their single Carbon account. This applies to citizens, government entities, and corporations.

If there are sufficient Carbons or sufficient Carbons have been purchased, the method debits N Carbons from the Carbon account of the consumer (424) and transfers X (monetary price of purchasable item+Y (any dollars spent to buy Carbons) from the consumer's monetary account to the account of the merchant (426). The method then checks the monetary transfer for success (428) and if the transfer was not successful, reverts the component transactions (430) and the purchase transaction is declined. If the monetary transfer is a success, the purchase transaction is closed (432) and then the method generates a receipt for the consumer for the purchase transaction (442). The purchase receipt may show, for example, the X dollars for the purchasable item, the N Carbons and then if Carbons had to be purchased, N-M Carbons purchased and Y dollars for the Carbon purchase. The transaction using the card is then completed.

If a consumer uses cash for a purchase, the consumer will always pay an additional surcharge on their purchases to pay for the Carbon cost of the transaction since the number of Carbons in the account of the consumer is unknown for a cash transaction. This surcharge is not a tax. It is the current (spot) monetary cost of the Carbons necessary to complete the transaction (434). The merchant's settlement entity, or another entity, purchases the Carbons necessary for the transaction on the Carbon Exchange and that amount is added to the transaction cost. This surcharge would appear on the consumer's receipt. The prevailing Carbon cost is known by the system and is presented to the consumer before they make the cash transaction. In the preferred embodiment, the exchange is operated in real-time. The exchange has provisions for quoting a price and holding that price for a long enough time period to complete a transaction. In other words, the system lets consumers know what the surcharge will be before the transaction is executed.

The method may then display X (the monetary cost of the purchasable item) and Y (the dollar cost of the Carbons) to allow the purchaser to proceed or cancel the transaction (436). The method then determines if cash is received (438) and revert the Carbon purchase (440) if no cash is received and cancels the sale. If the cash is received, then the same type of receipt is printed (442) that includes the Carbons purchased and the dollar cost of those Carbons to complete the sales transaction.

Industry-Wide Consumption Tiered Pricing Method

Residential utility tiered pricing has been shown to be effective in reducing consumption by increasing unit price, in steps, as consumption increases. Tiered pricing has been applied by electric utility companies and by water utility companies. In each case, those companies enjoy an effective monopoly as the only option for a residential consumer. Because of this monopoly, these companies are typically regulated, and their pricing is controlled. To reduce overall electric consumption in a just manner, regulators and their subject utility maintain a low-price baseline tier that allows low income, and/or energy conservative, consumers to pay a low price for their electricity. This low price, if applied at all consumption levels, would lead to very high overall consumption at a low marginal profit rate for the utility. Pricing tiers can be adjusted to reduce consumption and allow the utility to generate a reasonable return on investment to their stakeholders.

If there were a single supplier of fossil fuels, a tiered pricing scheme could be used to reduce consumption in a way that rewards low-consumption users, discourages high consumption, and maintains the profit of the single supplier. In most countries, there are a multitude of competing oil companies and thus no single supplier for which the typical tiered pricing scheme can be used. Furthermore, if one company were to implement tiered pricing at their gas stations, linked to a loyalty card (or other method), they would lose a customer as soon as that customer's consumption moved them into a pricing tier higher than the price of gas at a competing gas station so that tiered pricing does not seem to be possible within a competitive industry.

An industry-wide consumption tiered pricing method overcomes the above problem. The industry-wide consumption tiered pricing method may be implemented using the system 200 in FIG. 2 (and in particular the consumer price tier determination module 212). For illustration purposes, the retail sale of gasoline by oil companies will be used, but the concepts presented can be extended to other fossil fuel products and customers. Furthermore, the tiered pricing can also be extended to all products and services that emit Co2 in their manufacture or use as was already described above.

In the industry-wide consumption tiered pricing method, tiered pricing is implemented across all companies in an industry, or among industries. The consumption level and price at each tier can be set by regulators that may include regional or national government entities. Pricing tiers can be adjusted to reduce consumption while maintaining industry-wide profits (or multi-industry profits). The system does not impede competition within an industry. Each oil company will continue their competitive operations while enjoying their share of higher marginal prices on their sales. The system allows industry profits to be maintained as consumption is reduced.

The industry-wide consumption tiered pricing method uses the same Carbon described above that is allocated to each citizen (or resident) in the country and serves to track their consumption across all companies within an industry (or among and across multiple industries). The allocation is placed into a personal Carbon account for each citizen and, in the USA, it may be linked to social security number.

For the gas consumption example being used, a gallon of gas produces about 9 Kg of Co2 emissions (9 Carbons) when burned. Therefore, if regulators chose a baseline consumption per citizen of 1 gallon of gas a day, they would allocate 9 Carbons per day or 3,285 Carbons per citizen per year. This establishes a baseline consumption, below which the consumer will pay the lowest price. The monetary price of a gallon of gas is whatever the competitive marketplace determines (as it is today) plus the orthogonal price of 9 Carbons. When a consumer purchases gas using their payment card (or device), that card initiates the settlement of the monetary transaction (as it does today) and also causes the debit of 9 Carbons per gallon from the consumer's personal Carbon account. The system settles dual currency transactions as described above. Consumer purchases are tracked across all companies within the industry or among industries that sell products that release Co2 in their manufacture or use.

Tiered pricing can be implemented by adding a monetary surcharge based on total Carbons spent in the accounting/allocation period (yearly, monthly, etc.). For example, baseline consumption has no surcharge, consumption between baseline and two times baseline has a X % (or $Y) surcharge, etc. The surcharges can be adjusted to replace reduced industry profits. The surcharge revenue can flow directly to the selling company. Alternatively, the surcharge can be collected by a third-party and allocated to each company within the industry based on parameters from their GAAP accounting known as static tiered pricing.

In the preferred embodiment, the baseline consumption pricing is dynamically set using a Carbon Exchange (such as shown in FIG. 2 above). Any usage beyond baseline requires the purchase of Carbons on the Carbon exchange at the prevailing price. That price is set by bid/ask on the Carbon exchange. Consumers are free to sell their Carbons at any time on the exchange as discussed above. This scheme encourages consumers to minimize consumption. Below baseline consumers enjoy a monetary reward when they sell their extra Carbons and above baseline consumers must pay the surcharge after they consume their baseline allocation. If the Carbon exchange is efficient, it is nearly a zero-sum exchange between high consumption consumers and low consumption consumers and is fair for consumers.

However, regulated reduced consumption, driven by reduced baseline Carbon allocation, will lead to falling industry profits. This is politically unpalatable, especially in democracies influenced by industry lobbying. The system allows regulators to maintain overall industry profit by placing a transaction load on the exchange that is distributed to companies within the industry (or industries). Each oil company would receive a pro-rata share of the exchange load based on parameters from their GAAP accounting. It is anticipated that regulators adjust the exchange load periodically to provide sufficient cashflow to fund this profit-replacement as consumption is reduced. Companies within an industry (or among industries) are compensated for producing less (or emitting less Co2 into the atmosphere). By replacing profit lost as a result of reduced consumption, the system aligns the profit interests of the oil industry with the overall societal interest in reducing Co2 emissions to slow climate change.

For the tiered pricing method that may be implemented using the system in FIG. 2, at the time of sale, the customer is identified from their payment card or device. The system displays their pricing tier and the marginal price of the product within that tier as shown in FIGS. 2 and 4. If the customer chooses to pay with cash, the system displays the price for the highest consumption tier. The rest of the settlement process as the same as already described above.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A system, comprising:
   a user computer system having a display that interfaces with a computer system and displays a purchasable item to a purchaser, the purchasable item having a monetary price and a carbon price, the carbon price having a value corresponding to a number of kilograms of carbon dioxide emitted during a manufacturing and use of the purchasable item;
   a carbon cost computer system separate from the computer system that determines the carbon price of the purchasable item;
   the computer system having a processor and a plurality of instructions executed by the processor that is configured to:
   receive a transaction, communicated from the user computer system, in which the purchaser chooses to purchase the purchasable item;
   debit, in response to the received transaction, the monetary price of the purchasable item from an account of the purchaser; and debit, in response to the received transaction, the carbon price of the purchasable item from a carbon account of the purchaser linked to the account of the purchaser, wherein the carbon account receives a yearly allocation of carbon credits.

2. The system of claim 1, wherein the processor is further configured to determine, in response to the received transaction, that the purchaser does not have a number of carbon credits in the carbon account of the purchaser to cover the carbon price of the purchasable item, purchase, on a carbon exchange connected to the computer system, the number of carbon credits to cover the carbon price of the purchasable item and debit, for the purchased carbon credits, the account of the purchaser.

3. The system of claim 1, wherein the account of the purchaser is cash and wherein the processor is further configured to present the monetary price and a cash monetary price of the carbon price carbons to the purchaser for the purchasable item and charge, in response to the received transaction, the monetary price of the purchasable item and the cash monetary price of the carbon price carbons to the purchaser.

4. The system of 1, wherein the processor is further configured to determine a monetary surcharge for the purchasable item for the purchaser at a particular consumption level.

5. The system of claim 4, wherein the processor is further configured to add an additional monetary surcharge to the carbon price of the purchasable item for the purchaser when the purchaser is at a higher consumption level.

6. The system of claim 2, wherein the processor is further configured to sell, on the carbon exchange, a number of unused carbon credits of the purchaser and receive a monetary price for each unused carbon credit.

7. The system of claim 1, wherein the purchasable item is a product or a service.

8. The system of claim 1, wherein the processor is further configured to determine that the carbon account of the purchaser is not associated to the account of the purchaser and charge, in response to the received transaction, the monetary price of the purchasable item and a monetary price of the carbon price carbons to the purchaser.

9. The system of claim 1, wherein the account of the user is linked to a card and wherein the processor is further configured to receive debit information for the card from a point of sale device.

10. A method comprising:
   determining, by a carbon cost computer system, a carbon price of a purchasable item, the carbon price having a value corresponding to a number of kilograms of carbon dioxide emitted during a manufacturing and use of the purchasable item;
   displaying, on a computer system, the purchasable item to a purchaser, the purchasable item having a monetary price and the carbon price;
   receiving, at a second computer system connectable to the computer system that displays the purchasable item, a transaction in which the purchaser chooses to purchase the purchasable item;
   debiting, by the second computer system in response to the received transaction, the monetary price of the purchasable item from an account of the purchaser; and
   debiting, by the second computer system in response to the received transaction, the carbon price of the purchasable item from a carbon account of the purchaser linked to the account of the purchaser, wherein the carbon account receives a yearly allocation of carbon credits.

11. The method of claim 10 further comprising determining, by the second computer system in response to the received transaction, that the purchaser does not have a number of carbon credits in the carbon account of the purchaser to cover the carbon price of the purchasable item, purchasing, on a carbon exchange connected to the second computer system, the number of carbon credits to cover the carbon price of the purchasable item and debiting, for the purchased carbon credits, the account of the purchaser.

12. The method of claim 10, wherein the account of the purchaser is cash and further comprising presenting, on the computer system display, the monetary price and a cash monetary price of the carbon price carbons to the purchaser for the purchasable item and charging, in response to the received transaction by the second computer system, the monetary price of the purchasable item and the cash monetary price of the carbon price carbons to the purchaser.

13. The method of 10 further comprising determining a monetary surcharge for the purchasable item for the purchaser at a particular consumption level.

14. The method of claim 13, wherein determining the monetary surcharge further comprises adding an additional surcharge to the purchasable item for the purchaser when the purchaser is at a higher consumption level.

15. The method of claim 11 further comprising selling, on the carbon exchange, a number of unused carbon credits of the purchaser and receiving a monetary price for each unused carbon credit.

16. The method of claim 10, wherein the purchasable item is a product or a service.

17. The method of claim 10 further comprising determining that the carbon account of the purchaser is not associated to the account of the purchaser and charging, in response to the received transaction, the monetary price of the purchasable item and a monetary price of the carbon price carbons to the purchaser.

18. The method of claim 10, wherein the account of the user is linked to a card and further comprising receiving debit information for the card from a point of sale device.

19. A system, comprising:
   a carbon cost computer system separate from a computer system and connected to the computer system that determines the carbon price of the purchasable item, the carbon price having a value corresponding to a number of kilograms of carbon dioxide emitted during a manufacturing and use of the purchasable item;
   the computer system having a processor and a plurality of instructions executed by the processor that is configured to:
   send data to a purchaser about the purchasable item that has a monetary price and the carbon price;
   receive a transaction in which the purchaser chooses to purchase the purchasable item;
   debit, in response to the received transaction, the monetary price of the purchasable item from an account of the purchaser; and
   debit, in response to the received transaction, the carbon price of the purchasable item from a carbon account of the purchaser linked to the account of the purchaser, wherein the carbon account receives a yearly allocation of carbon credits.

20. The system of claim 19, wherein the processor is further configured to determine, in response to the received transaction, that the purchaser does not have a number of carbon credits in the carbon account of the purchaser to cover the carbon price of the purchasable item, purchase, on a carbon exchange connected to the computer system, the number of carbon credits to cover the carbon price of the purchasable item and debit, for the purchased carbon credits, the account of the purchaser.

21. The system of claim 19, wherein the account of the purchaser is cash and wherein the processor is further configured to present the monetary price and a monetary price of the carbons to the purchaser for the purchasable item and charge, in response to the received transaction, the monetary price of the purchasable item and the monetary price of the carbons to the purchaser.

22. The system of 19, wherein the processor is further configured to determine a monetary surcharge for the purchasable item for the purchaser at a particular consumption level and add an additional monetary surcharge to the carbon price of the purchasable item for the purchaser when the purchaser is at a higher consumption level.

* * * * *